United States Patent [19]

Peter

[11] 4,252,441
[45] Feb. 24, 1981

[54] ARRANGEMENT FOR MEASURING EXPOSURE IN PHOTOGRAPHY WITH AN ELECTRONIC EXPOSURE METER AND ADAPTER

[75] Inventor: Helmut Peter, Erlangen, Fed. Rep. of Germany

[73] Assignee: Gossen GmbH, Erlangen, Fed. Rep. of Germany

[21] Appl. No.: 932,432

[22] Filed: Aug. 10, 1978

[30] Foreign Application Priority Data

Oct. 13, 1977 [DE] Fed. Rep. of Germany ....... 2446028

[51] Int. Cl.$^3$ ............................ G01J 1/42; G01J 1/44
[52] U.S. Cl. .................................... 356/226; 356/224
[58] Field of Search ............... 356/213, 218, 224, 225, 356/226; 354/59

[56] References Cited

U.S. PATENT DOCUMENTS

| | | | |
|---|---|---|---|
| 3,286,097 | 11/1966 | Norwood | 250/209 |
| 3,697,179 | 10/1972 | Pfaffenberger et al. | 356/225 |

Primary Examiner—John K. Corbin
Assistant Examiner—Rodney Bovernick
Attorney, Agent, or Firm—Max Fogiel

[57] ABSTRACT

An arrangement for measuring exposure in which an adapter is attached to an electronic exposure meter. The adapter has at least three plugs mating with corresponding sockets on the exposure meter. The exposure meter has a circuit supplying a measured voltage which is a linear function of the logarithm of a measured magnitude. A defined constant voltage is taken from the exposure meter circuit and applied to two sockets. The adapter has a voltage divider whose external connections are formed by two plugs which apply a constant voltage upon plugging the adapter to the exposure meter through the sockets. The voltage divider has a tap which is connected to another plug that is, in turn, connected, through the associated socket in the exposure meter, to a point in the circuit where application of a correction voltage results in a change in measured voltage equivalent to an increase in the measured magnitude. The resistances of the voltage divider are fixed so that the correction voltage taken from the voltage divider fully compensates the measured voltage change resulting from light losses of the adapter. The voltage divider has a fixed resistor and a balancing trimmer to enable an adapter to be individually balanced or trimmed.

7 Claims, 5 Drawing Figures

ARRANGEMENT FOR MEASURING EXPOSURE IN PHOTOGRAPHY WITH AN ELECTRONIC EXPOSURE METER AND ADAPTER

BACKGROUND OF THE INVENTION

The present invention relates to a measuring arrangement consisting of an electronic exposure meter and an attachable adapter. The adapter has at least three plugs for making electrical contact, and the exposure meter has corresponding sockets.

It is the purpose of such a measuring arrangement to solve special measuring problems which cannot be solved or which can be only partially solved with an exposure meter for ordinary use.

One of the possible adapters has an optical system such that measurements with small and very small measuring angles (e.g. 1°) are possible. Another adapter is equipped with a flexible light conductor made of glass fiber and permits nearly pointlike measurements, for example, on the focusing screen of a camera for close-ups. Another adapter has a swiveling measuring head with a plane diffusor. Such adapters are known, for example fromm German Utility Patent No. 66 04 080.

The disadvantage of these known exposure meter systems is that the deviations of the measured value indications, caused by the light loss, must be given special consideration. This is achieved, for example, by special settings on the computing ring; in other cases, the user must make a special allowance in his calcuations for the light loss, which is very time-consuming. Furthermore, errors, and mistakes have to be expected.

Accordingly, it is an object of the present invention to construct the exposure meter, on the one hand, and the various adapters, on the other hand, in such a way that, when plugged into the exposure meter, the indication deviations resulting from the light loss are compensated.

Another object of the present invention is to provide an arrangement of the foregoing character which is substantially simple in construction and may be economically fabricated.

A further object of the present invention is to provide an arrangement, as described, which may be readily maintained in service and which has a substantially long operating life.

SUMMARY OF THE INVENTION

The objects of the present invention are achieved by having the light meter circuit supply a measuring voltage which is a linear function of the logarithm of the measured magnitude (luminance or intensity of illumination); a defined constant voltage, taken from the exposure meter circuit, is applied to two plug sockets. The adapter has a voltage divider whose external connections are two plugs which, upon being inserted with the adapter to the two sockets in the exposure meter, apply a constant voltage. The voltage pickoff of the voltage divider is connected to a third plug which is connected via the associated socket in the exposure meter to a point in the circuit such that application of a correction voltage results in a change of the measured voltage equivalent to an increase in the measured magnitude. The resistance data of the voltage divider are fixed in such a way that the correction voltage taken from the voltage divider fully compensates the measured voltage change resulting from light losses of the adapter. Ordinarily, the voltage divider may consist of fixed resistors having different data depending on the type of adapter. However, the voltage divider may also consist of a fixed resistor with a series-connected potentiometer used as compensation trimmer in order to compensate each adapter individually.

The advantage of the measuring arrangement according to the present invention is obvious. Thus, by plugging the adapter to the exposure meter, the consequences of the light losses are compensated automatically and the indicated measured values (f-numbers and shutter speeds or exposure meter readings/light values) are always valid without having to consider correction values; the measured values on the exposure meter can be read by the same method as when measuring without adapter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
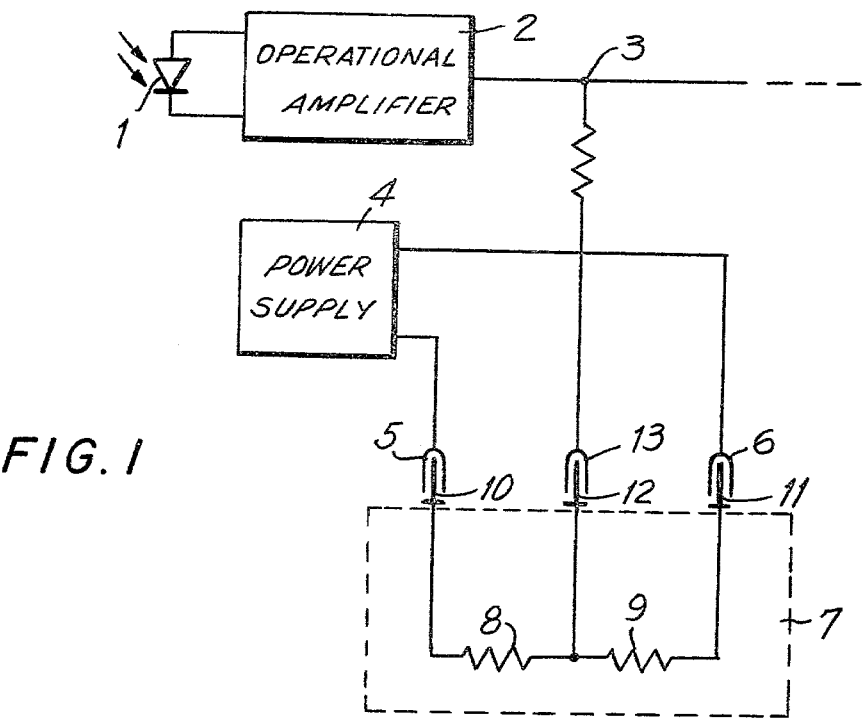
FIG. 1 and FIG. 2 show two schematics of the circuit in accordance with the present invention.
Figure 2:
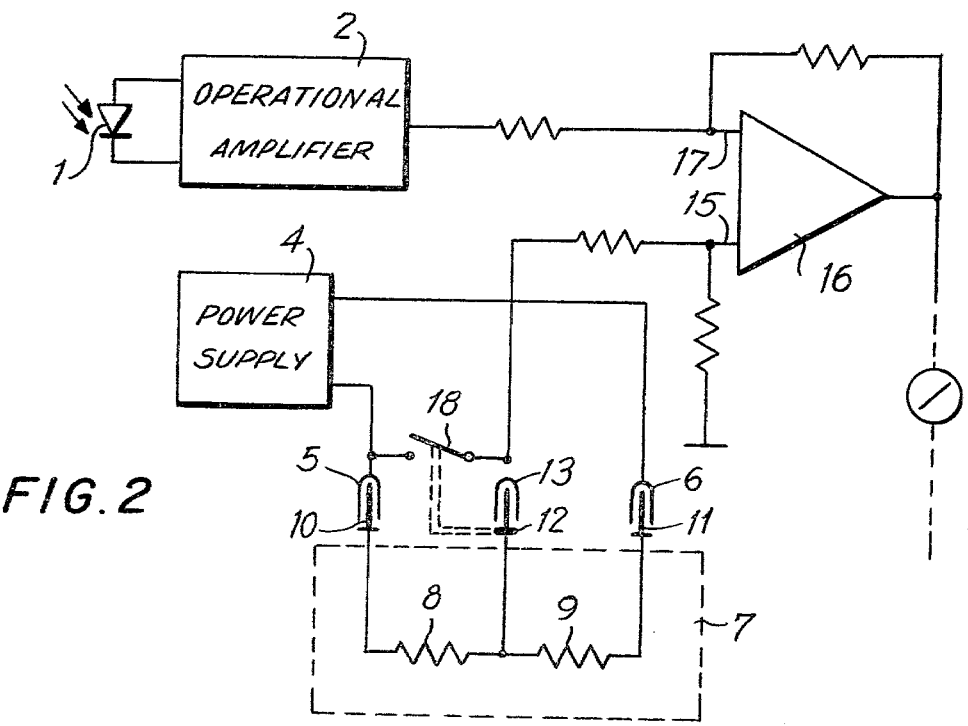

In FIGS. 1 and 2, the silicon photodiode 1, by means of the circuit element 2, applies to measuring point 3 a test voltage which is a linear function of the logarithm of the quantity to be measured. This can be achieved, for example, by making circuit element 2 an operational amplifier with an input having low resistance in comparison with the internal resistance of the photodiode 1, so that the photodiode delivers to the input of this operational amplifier a photocurrent which is proportional to the measured luminance or intensity of illumination throughout the entire measuring range. Determining the logarithm in this example is achieved by a feedback circuit with a diode or a transistor. Determining the logarithm can also be accomplished by measuring the open-circuit voltage of photodiode 1, using field effect transistors, since the open-circuit voltage for silicon photodiodes is a linear function of the logarithm of the measured quantity.

The basic circuit of the voltage divider in the adapter is also shown in FIGS. 1 and 2. The power supply 4 of the exposure meter applies a constant voltage to the female terminals 5 and 6 which, in the plugged-in condition, are connected to the two resistances 8, 9 with their external connections via male plugs 10, 11.

The correction voltage is picked off the tap or connection of the two resistors 8, 9 and applied to the third plug 12 of the adapter 7. In the example of FIG. 1, the correction voltage can be applied via the socket 13 in the exposure meter with suitable sign to test point 3 so that the measured voltage is increased by the amount that it was reduced by the adapter due to the light loss.

Also, the correction voltage picked off by the voltage divider 8, 9 in the adapter can be applied to a location on the exposure meter circuit where the logarithmic test voltage itself is not present, but so-to-speak, has an indirect effect on the measured voltage. This is possible, for example, with a differential amplifier 16 according to FIG. 2. Here, the measured voltage to be amplified is present on one input 17 and a fixed voltage (for example, zero) prevails at the other input 15 if the adapter is not plugged into the exposure meter.

If the adapter is plugged to the exposure meter, resistors 8, 9 are connected via plugs 10, 11 and associated sockets 5, 6 to the constant voltage 4 and plug 12 opens switch 18 and via socket 13 applies the correction voltage to the input 15 of the operational amplifier 16.

Depending on the type of adapter, the light loss varies so that the resistance data of the voltage divider being used by the adapter vary.

Figure 3:
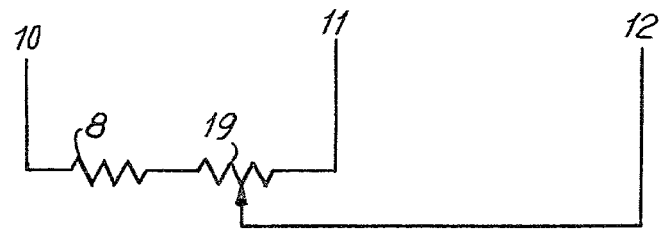
FIG. 3 shows the arrangement of the voltage divider with trimmer.

If the light loss variation of the individual samples of a type of adapter should become large, so that adequate accuracy cannot be achieved, an adjustable (balancing) potentiometer (trimmer) 19 is used instead of the one fixed resistor (FIG. 3).

Figure 4:
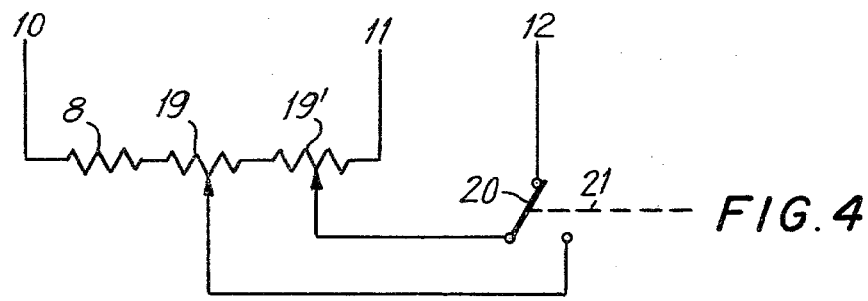
FIG. 4 shows the schematic of a two-stage switch-selected voltage divider.

In case an adapter is provided which has mechanically switchable measuring facilities, for example, measuring with two different sized measuring angles, the electrical selector switch 20 is made to select between two different correction voltages according to FIG. 4; the optical selector (not shown) may be mechanically coupled to the electrical selector switch 20—as is suggested by the broken line 21.

It may also occur that the measuring arrangement in accordance with the present invention is equipped with a special correction facility so that the user may, for example, arbitrarily achieve overexposure by a certain value in aperture steps. Then the adjustment axis of the compensation trimmer 19 (FIG. 3) is extended and carried to the outside and provided with an adjustment facility which may, for example, be a rotating knob with marker so that the correction or calibration factor or other factors can be read on a scale.

Figure 5:
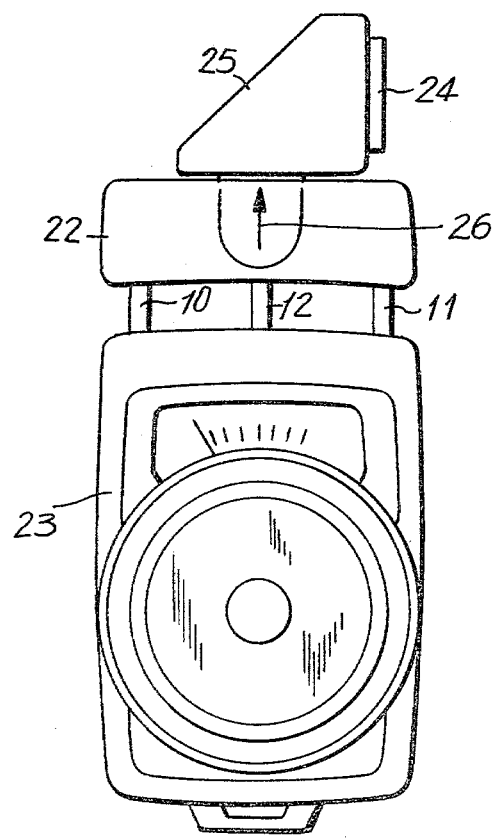
FIG. 5 shows an adapter (supplementary device) on the exposure meter.

FIG. 5 illustrates an adapter 22 at the moment on plug-in to the exposure meter 23. This example involves an adapter with a plane diffuser 24. Part 25 is rotatable about an axis indicated by arrow 26. The drawing also identifies the three plugs 10, 11, 12 which are used for establishing electrical contact and for mechanically attaching the adapter to the exposure meter.

Without further analysis, the foregoing will so fully reveal the gist of the present invention that others can, by applying current knowledge, readily adapt it for various applications without omitting features that, from the standpoint of prior art, fairly constitute essential characteristics of the generic of specific aspects of this invention, and therefore, such adaptations should and are intended to be comprehended within the meaning and range of equivalence of the following claims.

What is claimed is:

1. In a measuring arrangement for measuring exposure, comprising electronic exposure meter means having a constant voltage source, exchangeable adapter means for modifying light to be applied to said exposure meter means, said adapter means being attachable to said exposure meter means, the improvement comprising: first electric circuit means in said exposure meter means for supplying an output voltage which is a linear function of the logarithm of a measured light flux; second electric circuit means in said adapter means for supplying a correction voltage which compensates substantially a change in said output voltage caused by light losses of said adapter means; said adapter means having at least three plugs; mating sockets on said exposure meter means for mating with said plugs; said second electric circuit means in said adapter means comprising a voltage divider having two of said plugs for external connections and applying a defined constant voltage from said adapter means attached to said exposure meter means; said voltage divider having a voltage tap connected to a third one of said plugs, said third plug being connected through an associated socket in said exposure meter means to an output of said first electric circuit means to thereby apply said correction voltage to said output.

2. A measuring arrangement as defined in claim 1, wherein said voltage divider comprises a fixed resistor and a balancing potentiometer.

3. A measuring arrangement as defined in claim 1, wherein said voltage divider comprises a fixed resistor and two balancing potentiometers, and switching means connected to said potentiometers for selecting one of said potentiometer.

4. A measuring arrangement as defined in claim 3, wherein said switching means is actuated by an optical selector switch of said adapter means.

5. A measuring arrangement as defined in claim 4, including mechanical coupling means between said switching means and said optical selector switch.

6. A measuring arrangement as defined in claim 2, including adjustment means for adjusting said balancing potentiometer outside of said adapter means, said adjustment means indicating at least a set correction factor.

7. A measuring arrangement as defined in claim 2, including adjustment means for adjusting said balancing potentiometer outside of said adapter means, said adjustment means indicating at least a calibration factor.

* * * * *